Feb. 25, 1958 R. LEE 2,824,955

RADIO TRANSMITTING SYSTEM

Filed March 9, 1950

WITNESSES:

E. A. McCloskey.

Wm. C. Groome

INVENTOR

Reuben Lee.

BY F. E. Browder

ATTORNEY

United States Patent Office 2,824,955

Patented Feb. 25, 1958

2,824,955

RADIO TRANSMITTING SYSTEM

Reuben Lee, Linthicum Heights, Md., assignor to Westinghouse Electric Corporation, East Pittsburgh, Pa., a corporation of Pennsylvania Application March 9, 1950, Serial No. 148,533

3 Claims. (Cl. 250—17)

This invention relates to radio transmitting systems, and more particularly to a frequency modulated radio transmitting system comprising a frequency modulated transmitter and its associated antenna.

An object is to provide an improved frequency modulated radio transmitting system.

Frequency modulated transmitting systems have been proposed wherein the frequency of the transmitter is shifted simultaneously with the tuning of the antenna. One proposed method of accomplishing this is to provide a saturable reactor with the alternating current winding connected in series with the antenna tuning coil. Direct current or audio frequency power is applied to the input terminals of the control winding of the saturable reactor to change the effect of the inductance of the saturable reactor and thereby retune the antenna circuit in response to a shift in carrier frequency. Such an arrangement as just referred to has not been found to be practical because the total circuit Q is reduced too much due to the high losses in the saturable reactor. This situation can be remedied by providing more air gap in the reactor, but then the reactor is not sensitive to practical amounts of control power.

Another object is to provide an improved arrangement for tuning an antenna to a frequency modulated transmitter which eliminates the objections to previously proposed arrangements.

A still further object is to provide an improved arrangement comprising a saturable reactor for tuning an antenna to a frequency modulated transmitter.

These and other objects are effected by my invention as will be apparent from the following description and claims taken in accordance with the accompanying drawing, forming a part of the application, in which:

Figure 1:
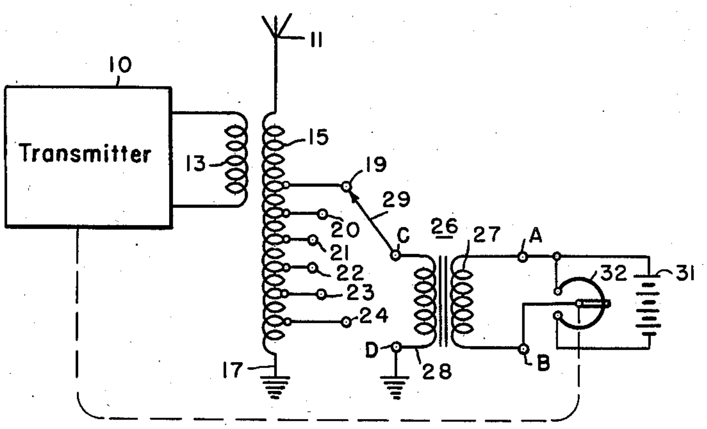
Figure 1 is a partially schematic and partially block diagram illustrating one embodiment of my invention.

Referring to the drawing in detail, in which like reference numerals illustrate like elements in all figures, in Fig. 1 I illustrate a conventional frequency modulated transmitter 10, connected to a conventional antenna 11. The transmitter 10 generates and delivers radio frequency energy to its output stage. Radio frequency energy is connected from the output stage of the transmitter 10 to the antenna 11 through an inductance 13 which is electrically connected to the output stage of the transmitter 10 and inductively coupled to a high Q tuning coil 15. The tuning coil 15 is connected in series between the antenna 11 and ground point 17. The lower end of the tuning coil 15 is provided with a plurality of taps 19, 20, 21, 22, 23 and 24.

A saturable reactor 26 having a control winding 27 and an alternating current winding 28 is provided for properly tuning the impedance of the antenna 11 to the impedance of the transmitter 10 so that the antenna 11 will give full output at the output frequency of the transmitter 10. The lower terminal D of the alternating current winding 28 is grounded and the upper terminal C is connected to a movable arm 29, which may be moved onto either of the taps 19, 20, 21, 22, 23 or 24 on the tuning coil 15. The terminals A and B of the control winding 27 are connected across a variable source of direct current power. This source of power may comprise a battery 31 and a variable resistance 32 or it may comprise a variable source of audio frequency power.

The arrangement illustrated in Fig. 1 overcomes difficulties encountered in previously proposed devices since the alternating current winding 28 of the saturable reactor 26 is tapped onto the tuning coil 15 at some satisfactory point, such as one of the tap points indicated, so that the winding 28 carries only a slight amount of the antenna current rather than all of it as with previously proposed arrangement. With my circuit the saturable reactor 26, which is a low Q device, affects the total Q of the transmitter and antenna circuit negligibly.

In the operation of the circuit of Fig. 1, when the carrier frequency of the transmitter 10 shifts up from the center frequency, the direct current or audio power applied to the terminals A—B of the saturable reactor 26 is increased, as schematically indicated on the drawing by the dotted line connection between the transmitter and the control potentiometer 32. This increase in power reduces the inductance effect of the saturable reactor 26 and retunes the antenna 11 to the higher frequency. When the carrier frequency shifts down from the center frequency, the direct current or audio power applied to the terminals A—B of the saturable reactor 26 is decreased. This decrease in power increases the inductance effect of the saturable reactor 26 and retunes the antenna 11 to the lower frequency.

The transmitter 10 may be a conventional frequency modulated type and it may be modulated in any conventional manner, such as by a teletype printing machine.

In an actual test of the circuit of Fig .1, it was found that a direct current of 800 milliamperes in the control coil 27 tuned the antenna 11 to a frequency shift of 100 cycles per second. The current in the tuning coil 15 was 8.55 amperes; the output from the antenna 11 was 100 watts; and the overall circuit Q was 132.

Figure 2:
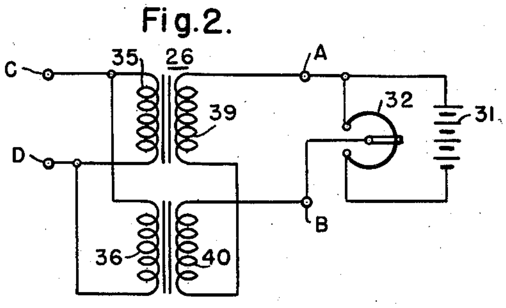
Fig. 2 illustrates a second arrangement of a saturable reactor which may be used in the circuit illustrated in Fig. 1.
Figure 3:
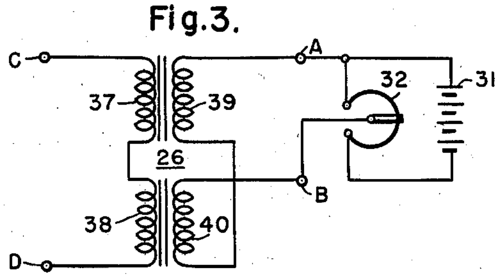
Fig. 3 illustrates a third arrangement of a saturable reactor which may be used in the circuit illustrated in Fig. 1.

Although the reactor 26 is illustrated schematically as a single unit in Fig. 1, it may consist of two or more reactors. Fig. 2 illustrates a saturable reactor 26 consisting of two toroids, or single reactors, with a pair of alternating current coils 35 and 36 connected in parallel. Fig. 3 illustrates a saturable reactor 26 consisting of two toroids, or single reactors, a pair of alternating current coils 37 and 38 connected in series. In both Fig. 2 and Fig. 3 the direct current or control coils 39 and 49 are connected bucking so as to prevent alternating current voltage from being induced in the direct current control coils. The reactors of Figs. 3 and 4 may be substituted for the reactor 26 of Fig. 1 by connecting corresponding referenced terminals of the reactors of Figs. 2 and 3 to the corresponding referenced terminals of Fig. 1. The reactors of Figs. 2 and 3 have been found to give good results when substituted in the circuit of Fig. 1 for the saturable reactor 26.

From the foregoing description taken in connection with the drawing it is seen that I have provided an improved system for tuning an antenna to match a shift in frequency of a frequency modulated transmitter without appreciably lowering the Q of the overall transmitter and antenna circuit.

While I have shown my invention in several forms, it will be obvious to those skilled in the art that it is not so limited, but is susceptible of various changes and modifications without departing from the spirit and scope thereof, and I desire, therefore, that only such limitations shall be placed thereon as are specifically set forth in the appended claims.

I claim as my invention:

1. In combination, a frequency modulated transmitter for generating and delivering radio frequency energy to an output circuit, an antenna for radiating energy generated by said transmitter, a tuning coil connected in series with said antenna, means for transferring radio frequency energy from said output circuit to said tuning coil, and a saturable reactor having an alternating current winding and a control winding, said alternating current winding being connected in shunt with a portion of said tuning coil, and means connecting said control winding to a source of control potential which varies as a function of the modulating frequency whereby said antenna is tuned to maintain maximum transfer of energy from said output circuit to said antenna.

2. In combination, a frequency modulated transmitter for generating and delivering radio frequency energy to an output circuit, an antenna for radiating energy generated by said transmitter, means for transferring radio frequency energy from said output circuit to said antenna, said means including a high Q tuning coil connected between said antenna and ground, said coil having a plurality of tap terminals, a low Q saturable reactor comprising an alternating current winding and a control winding, and said alternating current winding having one end grounded and another end ungrounded, means for selectively connecting said ungrounded end of said alternating current winding to any one of said tuning coil tap terminals, and means connecting said control winding to a source of signals which vary as a function of the modulating frequency, whereby maximum energy transfer between said output circuit and said antenna may be maintained for varying transmitter output frequencies.

3. In combination, a frequency modulated electric wave energy generator, a load device, means for transferring said wave energy from said generator to said load device, said means including an inductor connected in series with said load device, a saturable reactor having an alternating current winding and a control winding, means connecting said alternating current winding in shunt with a portion of said inductor, and means connecting said control winding to a source of control potential which varies as a function of the modulating frequency, whereby maximum transfer of wave energy from said generator to said load device may be maintained.

References Cited in the file of this patent

UNITED STATES PATENTS

| | | |
|---|---|---|
| 1,525,686 | Osnos | Feb. 10, 1925 |
| 1,684,235 | Love | Sept. 11, 1928 |
| 1,814,813 | Alexanderson | July 14, 1931 |
| 1,861,516 | Williamson et al. | June 7, 1932 |
| 2,084,899 | Edwards | June 22, 1937 |
| 2,250,090 | Bushbeck | July 22, 1941 |
| 2,279,441 | Buchmann et al. | Apr. 14, 1942 |
| 2,382,615 | Donley | Aug. 18, 1945 |